(12) United States Patent
Bonte et al.

(10) Patent No.: US 6,573,317 B2
(45) Date of Patent: Jun. 3, 2003

(54) LIGHT-STABLE COPOLYETHER ESTER COMPOSITION

(75) Inventors: Geert G. I. V. Bonte, Diepenbeek (BE); Pieter Gijsman, Groot Genhout (NL)

(73) Assignee: DSM N.V., Heerlen (NL)

( * ) Notice: Subject to any disclaimer, the term of this patent is extended or adjusted under 35 U.S.C. 154(b) by 90 days.

(21) Appl. No.: 09/842,369

(22) Filed: Apr. 26, 2001

(65) Prior Publication Data

US 2002/0032255 A1 Mar. 14, 2002

Related U.S. Application Data

(63) Continuation of application No. PCT/NL99/00654, filed on Oct. 20, 1999.

(30) Foreign Application Priority Data

Oct. 26, 1998 (NL) .............................................. 1010397

(51) Int. Cl.$^7$ ................................................. C08K 5/34
(52) U.S. Cl. ..................................................... 524/102
(58) Field of Search ......................................... 524/102

(56) References Cited

U.S. PATENT DOCUMENTS

| | | |
|---|---|---|
| 4,426,471 A | 1/1984 | Berner |
| 4,524,165 A | 6/1985 | Musser et al. |
| 5,985,961 A | 11/1999 | Dailey et al. |

FOREIGN PATENT DOCUMENTS

| | | |
|---|---|---|
| DE | 196 07 187 | 8/1996 |
| EP | 0 885 924 | 12/1998 |
| JP | 52 024 255 | 2/1977 |

*Primary Examiner*—Kriellion A. Sanders
(74) *Attorney, Agent, or Firm*—Pillsbury Winthrop LLP

(57) ABSTRACT

The invention relates to a copolyether ester composition protected against the influence of light that contains (1) a copolyether ester;
(2) a UV-light-absorbing compound;
(3) a hindered amine photostabilizer;
(4) optionally a thermal-oxidative stabilizer chosen from the group comprising phenolic compounds;
(5) optionally other additives, characterized in that the hindered amine photostabilizer is chosen from a group of compounds having the general formula (1).

The composition according to the invention shows a very small amount of discoloration in ageing under the influence of light.

9 Claims, No Drawings

LIGHT-STABLE COPOLYETHER ESTER COMPOSITION

This is a continuation of International Application No. PCT/NL99/00654 filed Oct. 20, 1999, which designates the U.S., and that International Application was published under PCT Article 21(2) in English.

The invention relates to a copolyether ester composition protected against the influence of light that contains a combination of a hindered amine photostabiliser (HALS) and a UV-light-absorbing organic compound. Such a copolyether ester composition is known and commercially available under the name of Hytrel UV20® from Du Pont De Nemours, USA; this composition contains 70 wt % of a copolyether ester based on butylene terephthalate and polytetramethylene oxide, 10 wt % of a hindered amine photostabiliser chosen from the group comprising 2,2,6,6-tetramethyl-substituted piperidyl esters of dicarboxylic acids (Tinuvin 144®, from Ciba-Geigy, Switzerland) and 10 wt % of a UV-light-absorbing compound, an optionally chlorinated 2-(2-hydroxy-3',5'-di-tert-butyl-phenyl) benzotriazole. This composition also contains 10 wt % of a phenolic thermal-oxidative stabiliser, namely IRGANOX 1010®, from Ciba-Geigy, Switzerland. The composition is generally used as a masterbatch and must be mixed, in the desired concentration, with the copolyether ester compositions used in objects that are exposed to the effects of light. A very interesting application of such a composition is for example in ski boots. Besides high mechanical requirements, very high aesthetic requirements are imposed on this last application. Discolouration under the influence of light, for example, is absolutely undesirable.

The known composition according to the state of the art shows shortcomings especially as regards the retention of colour in ageing under the influence of light.

The aim of the invention is hence a copolyether ester composition that shows less discolouration.

The inventors have achieved this aim by using as the hindered amine photostabiliser a compound from the group of compounds having the general formula 1.

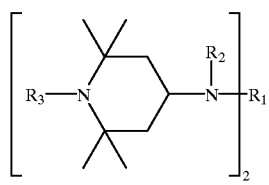

(1)
where
$R_1 = C_nH_{2n}$
$R_2 = H$, $C_mH_{2m+1}$ or

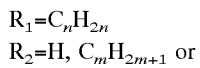

$R_3 = H$ or an alkyl group with 1 to 12 carbon atoms
where
n=1, 2, 3, 4, 5 or 6
m=1, 2, 3, 4, 5, 6, 7, 8, 9, 10, 11 or 12.

Preferably n is chosen to be at least 2. The best results are obtained when n=6 and

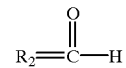

The copolyether ester composition according to the invention consequently contains the following components:
(1) a copolyether ester;
(2) a UV-light-absorbing compound;
(3) a hindered amine photostabiliser;
(4) optionally a thermal-oxidative stabiliser chosen from the group comprising phenolic compounds;
(5) optionally other additives;
characterised in that the hindered amine photostabiliser (component (3)) is chosen from the group of compounds having the general formula (1).

When the hindered amine photostabiliser of the invention is used in combination with a UV-light-absorbing compound it is moreover found that the presence of the phenolic thermal-oxidative stabiliser according to the state of the art is not necessary to ensure the retention of colour in ageing under the influence of light.

The composition according to invention can be obtained with the usual methods. For example by powder coating components (2) to (5) in the desired concentration onto the granules of the copolyether ester (component (1)) before these granules are processed, for example by means of injection-moulding, into the objects exposed to the influence of light. By using the so-called masterbatch technique, in which first granules with a high concentration of stabilisers are produced, which granules are then mixed, in the desired concentration, with copolyether ester granules that do not contain components (2) to (3), a composition with an accurate concentration of components (2) and (3) can be obtained.

The concentrations in which components (2) and (3) are present in the copolyether ester composition according to the invention may vary within a very wide range, and are partly determined by the conditions to which the objects obtained from the composition will be exposed. In general, these concentrations will vary between 0.05 and 1 wt %, relative to the copolyether ester. The ratio of the different stabilising components (2) and (3) in the composition may then vary within a wide range, depending on the desired properties and the copolyether ester used, for example between 0.1 and 10. If the composition is used as a mastermatch, the concentrations will of course be approximately at least a factor of 10 higher than in the composition for the final application. Preferably the concentrations will then lie between 0.5 and 20 wt %.

In principle, any copolyether ester containing hard segments composed of repeating units derived from at least one alkylene glycol and at least one aromatic or cycloaliphatic dicarboxylic acid and soft segments derived from at least one polyalkylene oxide glycol can be used as a copolyether ester for the composition according to the invention. Examples of alkylene glycols are ethylene glycol, propylene glycol and butylene glycol. Examples of aromatic dicarboxylic acids are terephthalic acid, isophthalic acid, 2,6-naphthalenedicarboxylic acid and 4,4-diphenyldicarboxylic acid. Examples of polyalkylene oxide glycols are polyethylene oxide glycol, polypropylene oxide glycol, polytetramethylene oxide glycol or combinations thereof, for example with ethylene-oxide-terminated polypropylene oxide glycol.

The preparation and properties of copolyether esters are known to a person skilled in the art and for example described in detail in *Thermoplastic Elastomers*, 2nd Ed., Chapter 8, Carl Hanser Verlag (1996) ISBN 1-56990-205-4, *Handbook of Thermoplastics*, Ed. O. Otabisi, Chapter 17, Marcel Dekker Inc., New York 1997, ISBN 0-8247-9797-3, and the *Encyclopedia of Polymer Science and Engineering*, Vol. 12, pp. 75–117 (1988), John Wiley and Sons, and the references mentioned therein.

The composition according to the invention may also contain the usual additives, pigments and processing aids.

The invention will now be further elucidated with reference to the following examples and comparative experiments, without being limited hereto.

EXAMPLES

The Materials Used
(1) copolyether ester Arnitel® EM 740 (74 Shore.D)
(2) UV-light-absorbing compound:
   Tinuvin®234, a benzotriazole from Ciba-Geigy, Switzerland;
   Tinuvin®1577, a triazine substituted with 3 phenyl rings from Ciba-Geigy, Switzerland;
   Tinuvin®237, a chlorine-substituted benzotriazole from Ciba Geigy, Switzerland;

(3) hindered amine photostabilisers (HALS)
   Uvimil®FK4145: N,N,N',N'-bis(formyl)-bis(2,2,6,6-tetramethyl-4 piperidyl-1,6-hexanediamine from BASF, Germany,
   HMBTAD®: N,N'-bis-(2,2,6,6,-tetramethyl-4-piperidyl)-1,6-hexanediamine from Huels, Germany,
   Tinuvin 144®: bis-(1,2,2,6,6-pentamethyl-piperidyl)-(3', 5'-di-tert-butyl-4'-hydroxybenzyl)-butylmalonate from Ciba Geigy, Switzerland;
(4) phenolic thermal-oxidative stabiliser:
   Irganox®1010 from Ciba-Geigy, Switzerland.

Test Methods

The copolyether ester compositions were injection-moulded to form test bars for tensile tests according to ISO R527.

Ageing was effected by illuminating the specimens in an Atlas WOM 65A (Weather-o-meter) apparatus fitted with a Xenon light source under the following conditions:

intensity: 0.55 W/m² at 340 nm black standard: 80° C.

ambient temperature: 50° C.

relative humidity: 50% dry/wet cycle: 102/18 minutes

Samples were taken out and mechanically tested at regular intervals; the degree of discolouration was also determined.

Mechanical Testing

The elongation at break (E.A.B.) of the test bars was determined according to ISO R527. (50 mm/min.)

Colour measurements were performed using a "Macbeth 1500 plus" apparatus with a D65 incident light at an angle of 10°;

$$\Delta E = \sqrt{(\Delta L)^2 + (\Delta a)^2 + (\Delta b)^2}$$

was determined as a function of time according to the CIE-LAB technique.

Composition and results

| Example | Stabilisers | % by weight | ΔE hours |     |     | E.A.B. [%] hours |     |     |     |
|---------|-------------|-------------|------|------|------|-----|-----|-----|-----|
|         |             |             | 20   | 100  | 500  | 0   | 100 | 300 | 600 |
| I       | HMBTAD + Tinuvin ®234* | 0.5/1 | 1.4 | 2.3 | 2.7 | 900 | 860 | 760 | 670 |
| II      | FK4145 + Tinuvin ®234* | 0.25/0.25 | 2.3 | 3.3 | 3.1 | 900 | 600 | 240 | 180 |
| III     | FK4145 + Tinuvin ®234 | 0.25/0.25 | 2.4 | 3.6 | 2.9 | 900 | 600 | 200 | 150 |
| IV      | HMBTAD + Tinuvin ®1577* | 0.25/0.25 | 2.0 | 2.6 | 2.8 | 900 | 650 | 350 | 150 |
| A       | Tinuvin ®144 + Tinuvin ®234 | 0.25/0.25 | 3.2 | 5.1 | 6.3 | 850 | 680 | 320 | 150 |
| B       | Tinuvin ®144 + Tinuvin ®234* | 0.25/0.25 | 4.2 | 5.9 | 5.6 | 880 | 570 | 230 | 100 |
| C       | UV20 2,5%   | 0.25/0.25   | 4.3 | 6.2 | 6.3 | 870 | 610 | 130 | 130 |
| D       | UV20 10%    | 1.0/1.0     |     |     |     | 930 | 880 | 860 | 800 |

Explanatory notes:
(.../...): percentage by weight relative to the weight of the copolyether ester.
With the exception of C and D, all the compositions were prepared by powder coating the stabilisers onto the copolyether ester granules.
C and D masterbatch from Hytrel UV20 ® (according to the state of the art)
E: simulation of C powder coated with stabiliser
*in the presence of 0.25 wt % Irganox 1010 ®.

The above results show that the colour stability (Δ E) of the compositions according to the invention is substantially better, (Examples I up to and including IV), than that of the compositions according to the state of the art (Comparative Examples A–E). The mechanical ageing (E.A.B.) is at approximately the same level.

What is claimed is:

1. Copolyether ester composition containing
   (1) a copolyether ester;
   (2) a UV-light-absorbing compound;
   (3) a hindered amine photostabiliser;
   (4) optionally a thermal-oxidative stabiliser chosen from the group comprising phenolic compounds;
   (5) optionally other additives, characterised in that the hindered amine photostabiliser is chosen from a group of compounds having the general formula

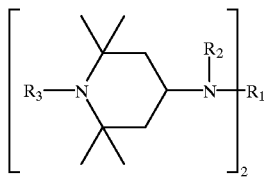 (1)

where
$R_1 = C_nH_{2n}$
$R_2 = H, C_mH_{2m+1}$

$R_3$ = H or an alkyl group with 1 to 12 carbon atoms
where
n = 1, 2, 3, 4, 5 or 6
m = 1, 2, 3, 4, 5, 6, 7, 8, 9, 10, 11 or 12.

2. Copolyether ester composition according to claim 1, wherein n is at least 2.

3. Copolyether ester composition according to claim 1, wherein n=6 and $R_2$=C–H.

4. Composition according to claim 1, wherein the concentrations of components (2) and (3) are between 0.05 and 1 wt. %, relative to the copolyether ester (component (1)).

5. Composition according to claim 1, wherein the hindered amine photostabiliser (component (3)) is selected from the group consisting of N,N'-bis (2,2,6,6-tetramethyl-4-piperidyl)-1,6 hexanediamine and N,N,N', N'-bis-(formyl)-bis (2,2,6,6-tetramethyl-4-piperidyl) 1,6 hexanediamine.

6. Composition according to claim 1, wherein a thermal-oxidative stabiliser chosen from the group of phenolic compounds is also present.

7. Process for the preparation of the composition according to claim 1, comprising mixing granules of a copolyether ester composition that contains components (2) and (3) in a concentration of between 0.5 and 20 wt. % and copolyether ester granules that do not contain components (2) and (3).

8. An article of manufacture comprising the composition according to claim 1.

9. Ski boot comprising the composition according to claim 1.

* * * * *